Aug. 4, 1964    R. H. STRASBAUGH    3,142,905
SPACING AND CUTTING MEANS
Filed April 26, 1961    3 Sheets-Sheet 1

INVENTOR.
RAY H. STRASBAUGH
BY
Howard L. Johnson
ATTORNEY

Aug. 4, 1964 — R. H. STRASBAUGH — 3,142,905
SPACING AND CUTTING MEANS
Filed April 26, 1961 — 3 Sheets-Sheet 2
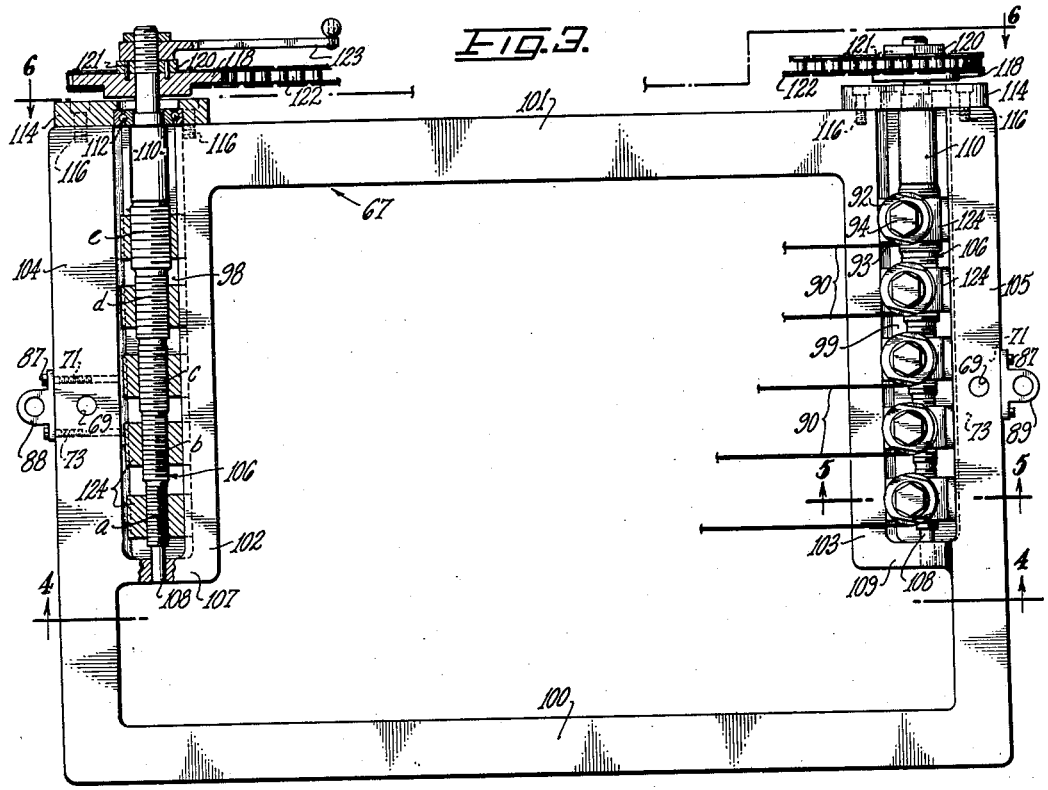
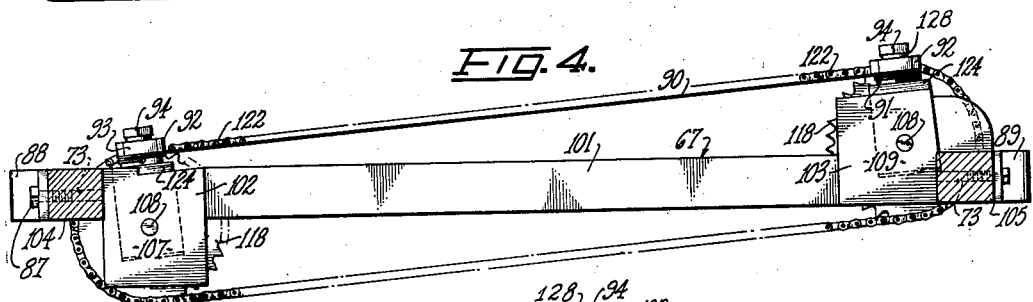
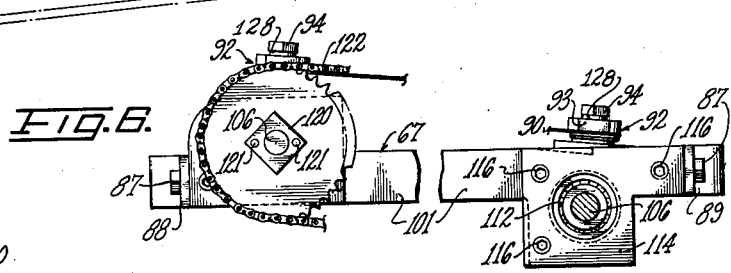
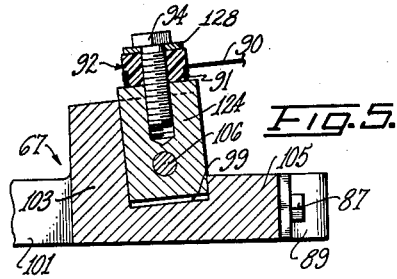
INVENTOR.
RAY H. STRASBAUGH
BY Howard L. Johnson
ATTORNEY

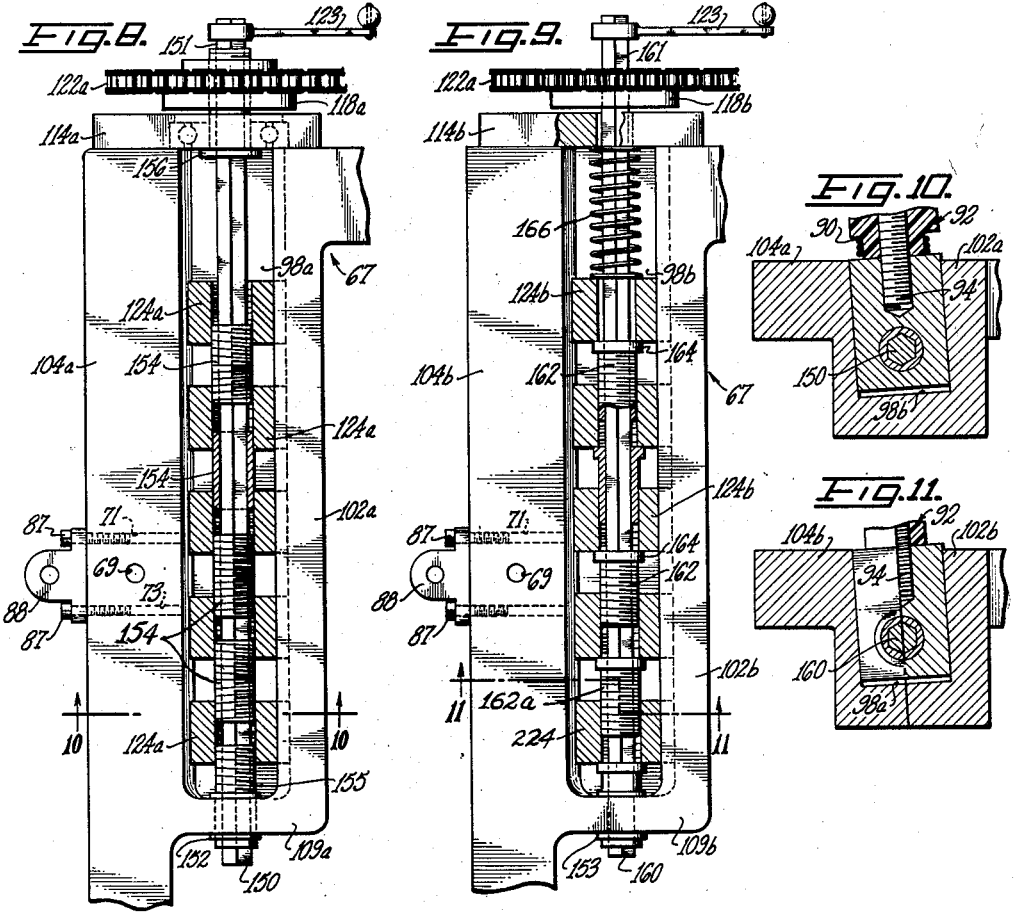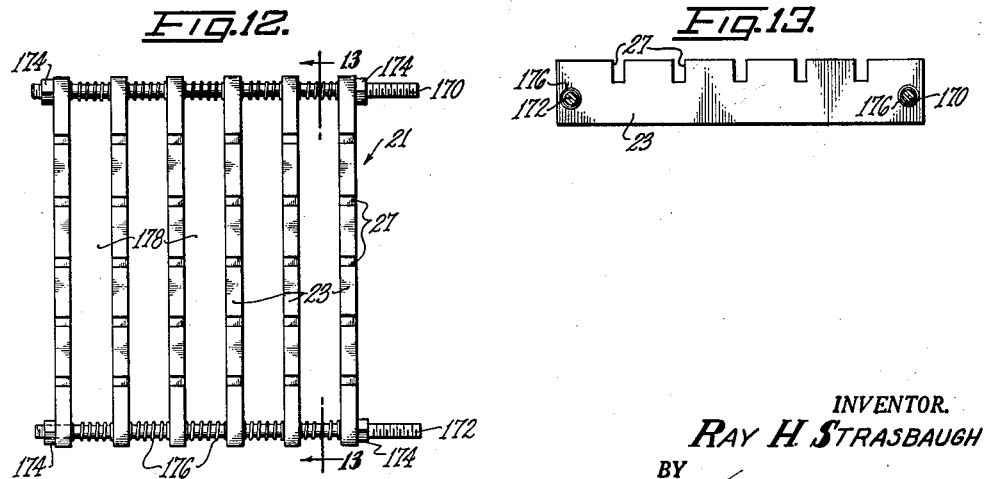
INVENTOR.
RAY H. STRASBAUGH

United States Patent Office 3,142,905
Patented Aug. 4, 1964

3,142,905
SPACING AND CUTTING MEANS
Ray H. Strasbaugh, 10990 S. Santa Fe Ave.,
Downey, Calif.
Filed Apr. 26, 1961, Ser. No. 105,589
8 Claims. (Cl. 31—24)

This invention relates to means for simultaneously moving members of a parallel series of positioning or contacting elements together and apart while maintaining their equal (altho increasing or diminishing) distance from each other. It pertains also to various measuring, cutting, locating or sorting devices which incorporate or utilize such adjustable means. By way of example, the invention is here illustrated primarily by reference to its embodiment in a cheese cutting machine wherein the adjustable positioning means are utilized to keep equidistant successive members of a parallel series of cutting or slicing wires which thus slice a block of cheese into pieces of equal thickness, which thickness may be varied from block to block by setting the adjustable means.

A typical cheese cutting machine currently includes (1) a table or elevated, horizontal work surface, (2) a pallet or cheese-supporting and -positioning mount disposed on the table, (3) a cutting head consisting of a frame carrying a series of wires which segment a piece of cheese by passing thru it in one direction in a single stroke; the head or heads may be vertically reciprocable and/or horizontally reciprocable, (4) in the case of a horizontally reciprocable head, there is also an upright cheese holder or barrier toward which the cutting head moves (analogous to a vertically moving head travelling thru the cheese toward the supporting pallet) such barrier conveniently taking the form of an outswinging gate or otherwise adjustable stop, (5) mechanism usually including an electric or pneumatic motor for reciprocating the head or heads, or alternately for moving the pallet against a fixed head. In the case of two (perpendicular) cutting heads, they move in sequence (rather than simultaneously) in cutting thru the block of cheese and then return to their starting position after the cut segments have been removed from the path. Similar cutters can be used to slice or cube butter, candy, wax, potatoes, carrots, lettuce, cabbage, fruit, or slabs of pressed or congealed products such as mush, potted meat, figs, dates, etc.

By the present invention, each of the series of parallel cutting wires carried by a head frame has each end attached to an individual suspension post, and the two opposing rows of posts are mounted as nuts on two longitudinal screws or positioning rods which are disposed along opposite sides of the frame, each nut (thus carried on a screw) having a different pitch corresponding to the pitch of successive thread segments on the screw, and the series of nuts on each screw being held against rotation by location in a longitudinal guideway (which also journals the screw at each end) so that rotation of a screw is accomplished without longitudinal movement thereof and is accompanied by longitudinal movement of the nuts without their rotation, thereby causing the suspension posts and their respective cutting wires to move toward and away from each other an amount which maintains their equal separation. Accordingly the wires always cut slices of cheese of equal width and the desired width of a slice is predetermined by turning the positioning screw. The two screws along opposite sides of a frame are connected for simultaneous and equal rotation in unison in either direction so that the parallel series of wires suspended therebetween always remain parallel. In addition, by mounting two such pairs of screws and suspension wires at right angles to each other on a rectangular frame, the block of cheese can be cut into elongated squares or rectangles at one stroke, which by a second cutting head can then be transformed into cubes or small blocks by a transverse stroke of the second head. The movement apart and together of the individual wires or suspension posts of a series in such amount as always to maintain their equal distance from each adjacent one is dependent upon use of a particular sequence of pitch of successive thread segments of each screw (and corresponding nut) as hereafter detailed, the sequence of pitch of consecutive segments being invariable but any portion thereof being usable by itself—i.e. any adjacent pair or consecutive trio of pitches from the sequence being applicable when only suspending two or three cutting wires as the case may be.

Use of the positioning screw having the present sequence of pitches or other positioning rods is not limited to their employment in pairs as just described for the cheese cutting head, but one may be utilized alone, being located intermediate the ends of transversely extending spacing or cutting elements thus movable apart and together by means of the carried nuts. Alternately, two such screws may be disposed end to end, each carrying a transverse series of locating elements spaced outward from a stationary line or divider transverse to the junction line of the adjacent screw ends, and both screws simultaneously activated as by rotation of a junction nut threadedly engaging the adjacent ends by right and left hand threads respectively.

Likewise, instead of carrying parallel series of cutting or scoring edges (whether wires or bands), one of the present rods may be used to locate a transverse series of classification or sorting elements wherein it is desired to change the spacing from time to time. In particular, such variable spacing of parallel slots or rails is useful in separating rollable articles such as fruits or vegetables, the size which would pass between the rails being thus separated from larger ones. Upon closing the rails further, those which first passed thru could be again fractionated upon a subsequent run. Lumps of coal, crushed stone, and other bulk material of gross particle size can be similarly classified or fractionated. Again, series of spacing elements carried by the present positioning rods can be used to align open-top containers in position for filling or emptying (or other manipulation thereof or therewith), the variability of the spacing being employed to accommodate batches of containers of different dimensions—e.g. after being used to align a batch of quart bottles, the spacing elements would be moved together to accommodate widths of a subsequent batch of pint bottles or vice versa.

Alternately the positioning rod(s) may be polygonal in section, and each suspension post or nut carried therealong (located for slidable movement apart and together in the longitudinal guideway which journals the rotatable positioning rod) is threadedly mounted directly on an externally threaded sleeve which latter is internally keyed for sliding longitudinal movement only, along the polygonal rod on which it is mounted. Joint rotation of the rod and keyed sleeve in unison, therefor moves the concentrically disposed nuts lengthwise in the guideway due to coaction of the threadedly engaged portions of sleeve and nut, and the axial movement of each nut by its respective sliding sleeve separates or draws together the several nuts of the series an equal distance.

In one form, the sleeve is formed with right and left hand threads extending medially from its respective ends, and the nuts are correspondingly threaded so that each intermediate sleeve has its opposite ends threadedly inserted in two different nuts and by means of sleeve rotation by the polygonal positioning rod, each individual nut slides toward or away from each other an equal distance along the guideway, which linear movement is contributed partly by the travel of the sleeves along the rod and partly by the travel of each nut along two sleeves. In another form, the sleeve is externally threaded from only one end so as to carry only one nut, the opposite sleeve end being disposed to abut against (and push) the adjacent nut. A resilient element such as a coil spring carried by the rod keeps successive sleeve abutment ends and nuts in rotational registration, so that rotation of the polygonal rod in either direction results in each carried nut being moved toward or away from its neighbor an equal distance along the guideway.

The invention also provides an improved pallet to hold a severable workpiece (exemplified by a block of cheese) which is correspondingly adjustable for use with the type of vertically reciprocable cutting head above described, so that a series of adjustably spaced cutting edges or wires may pass completely thru a piece of cheese and enter aligned channels in the pallet, the separation of which channels is likewise variable.

Other objects and advantages will become apparent as the description procedes, having particular reference to the illustrated embodiment of the invention in a presently preferred form of cheese cutting machine wherein FIGURE 1 is a perspective view of my machine with the vertically reciprocable cutting head in elevated position, the horizontally reciprocable head at the (left) end of the stroke and the barrier gate outswung;

FIGURE 3 is a plan view of a cutting head using a pair of the present positioning screws for suspending a parallel series of cutting wires between them across the head frame, some of the structures on the left of the frame appearing in axial section;

FIGURE 4 is a transverse sectional view thru the head of FIGURE 3 as viewed along the line 4—4;

FIGURE 5 is a transverse sectional view thru a wire-holding suspension post or nut mounted on the positioning screw within the slideway as seen along the line 5—5 of FIGURE 3;

FIGURE 6 is an end view of the head of FIGURE 3 as viewed along the line 6—6;

FIGURES 8 and 9 are plan views of the left side of the frame of FIGURE 3 constructed with hexagonal activating rods in place of the previous positioning screws and two different forms of connections between the respective rods and their carried suspension posts, the latter nuts or posts and in each case one of the intermediate sleeves appearing in axial section;

FIGURE 10 is a transverse sectional view thru a mounted suspension post along the line 10—10 of FIGURE 8;

FIGURE 11 is a transverse sectional view thru a differently mounted suspension post along the line 11—11 of FIGURE 9;

FIGURE 12 is a top plan view of an adjustable-spacing pallet or holder for the workpiece being cut, which pallet is particularly adapted for use with the adjustably spaced cutting heads; and FIGURE 13 is a sectional view thru the mounting screws of the pallet, showing a transverse spacing element or slat in side elevation.

Figure 1:
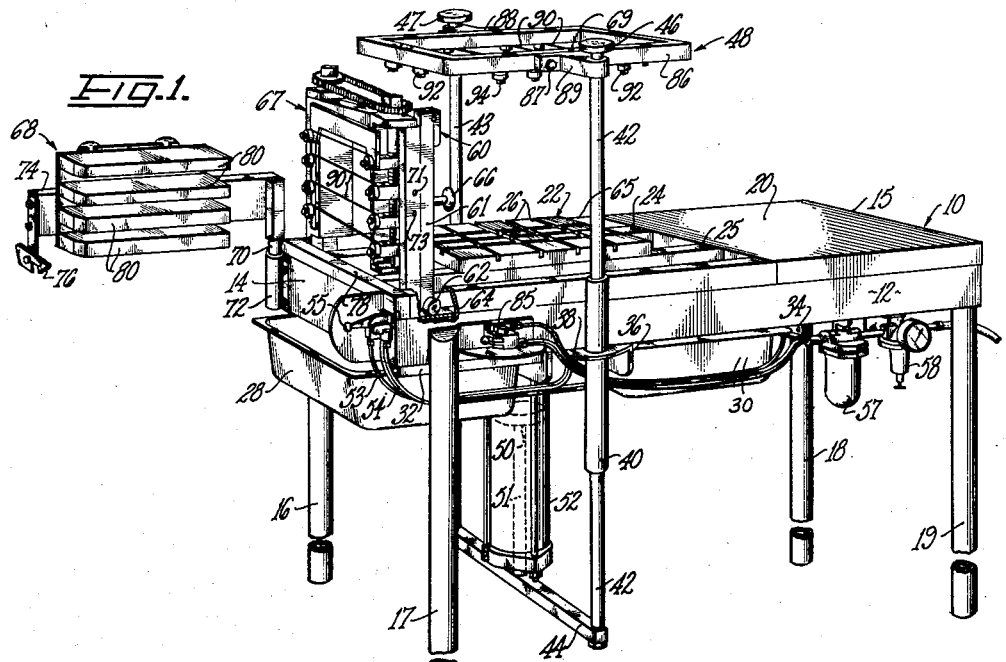
Figure 2:
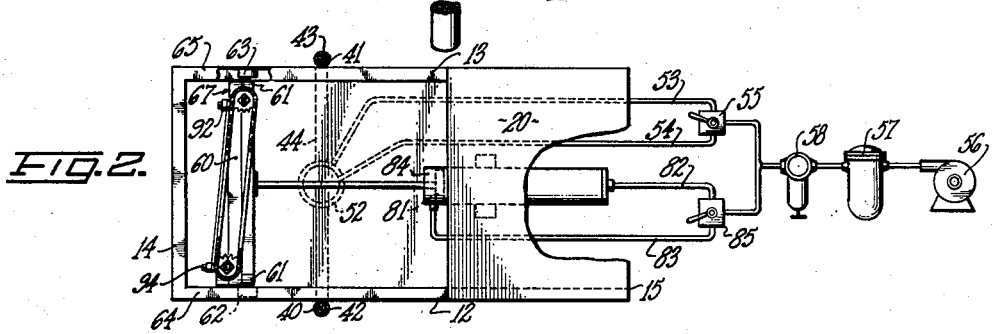
FIGURE 2 is a plan view of the lower structure of the machine with activating mechanism and connections indicated somewhat schematically.

As here depicted, there is provided a mounting structure or enclosure 10 formed of upright side 12, 13 and end 14, 15 walls arranged as a rectangle and supported from the floor by legs 16, 17 18, 19 of suitable (generally fixed) height. Adjacent one end, a flat-top, work surface 20 is disposed over the upright walls, while more-or-less centered within the remaining horizontal top area of the structure, a rectangular pallet 22 is spaced laterally inward from the surrounding frame walls and supported thereabove by a parallel pair of longitudinal rails 24, 25. The top surface of the pallet is adapted to support a block or wheel of cheese or other material placed thereon for single-stroke cutting or slicing, including loaf material such as bread or sausage. The pallet face may be scored or milled with a pattern 26 serving as a guide for locating the work-piece thereon relative to the aligned cutting head(s) as well as to receive the vertically descending cutting wires in the grooves after they have traversed the material from top to bottom. Beneath each end of the pallet is a removable, open-topped tray 28, 30 suspended below the frame enclosure walls 12, 13, 14 by lateral pairs of slide channels 32, 34 so that the trays may accumulate scraps or droppings from the cutting operations and be drawn out for emptying from time to time.

Between the pair of lower trays 28, 30 and separating them laterally underneath the frame 10, there is a cross brace 36 affixed across the bottom edges of the side walls 12, 13 with a vertically apertured, flat, terminal projection 38 at each end extending beyond the respective side wall and securing a cylindrical tube 40, 41 upright against the outer face of each side wall. Extending completely thru each tube is an upright cylindrical rod 42, 43 longitudinally slidable therein, with the two parallel rods having their lower ends connected beneath the frame by a cross brace 44 and bearing at their tops a terminally threaded bolt with a hand knob 46, 47 for removable securing across their tops a horizontally disposed frame or cutting head 48 thus spaced above the pallet 22. The pair of side rods 42, 43, together with the upper cutting head 48 and the lower connecting brace 44 accordingly define an upright rectangle which is vertically reciprocable (within the bearing tubes 40, 41) by means of a piston 50 having its head disposed within an upstanding cylinder 52 with the lower terminus of the piston rod 51 secured intermediate the cross member 44. Thru lines 53, 54, compressed air is admitted to the top or bottom of the chamber 52 by hand valve 55 from a compressor pump 56 thru an air filter 57 and pressure regulator 58.

A horizontally reciprocable standard 60 comprising a U-shaped structure has the bottom ends of its upright side arms 61 supported on rollers 62, 63 which are carried on horizontal channel rails 64, 65 having a lesser transverse span than that between the upright rods 42, 43 so that (the cutting head 48 being in elevated position) the standard can be rolled back and forth between the arms 42, 43. A vertically disposed rectangular cutting head 67 is removably secured to each upright arm 61 of the standard by a large headed bolt 66 threadedly received in a socket 69 (FIG. 3), and is also formed with a pair of threaded bores 71, 73 along each side edge for coupling of removable mounting ears 88, 89 for attachment to the upright arms 42, 43. Thus the vertical and horizontal cutting heads are interchangeable.

In operation, the vertical cutting head 67 moves from right to left (as viewed in FIGURE 1) and accordingly in order to support the opposite end of the cheese or other workpiece thru which the wires or cutting edges are passed, there is provided an abutment gate or barrier 68 swingable on a vertical pintle 70 which is mounted in an upright socket tube 72. The gate is formed of a vertical panel 74 disposable (when closed) above and parallel to the end closure wall 14 and carries a latch 76 adapted to overlie and engage the upper edge of a cross bar 78 which is located above the end wall 14 in position to block the ends of the channel rails 64, 65. Projecting perpendicularly from the inner face of the swinging panel 74, is a parallel series of vertically separated, horizontally disposed, edge-contact blocks 80 having a length generally corresponding to the width of the pallet 22 and thus adapted to engage one end or side of a block of cheese which is supported upon the pallet. Mechanical reciprocation of the standard 60 with its attached slicing head 67 is effected by a horizontally disposed piston 81 activated by air lines 82, 83 connected to opposite ends of a piston chamber 84 and controlled by a hand switch 85. The two valves or switches 55 and 85 controlling the vertically and horizontally reciprocable heads respectively, can be operated in either sequence but obviously not simultaneously; and often only one head will be used on a workpiece.

Either cutting head may have a fixed or movable pattern of cutting wires or blades. As here illustrated, the top cutting head 48 of FIGURE 1 carries a fixed pattern of wires 90 corresponding in spacing to the grill or channel pattern 26 on the aligned pallet 22 beneath. A generally rectangular, open-center frame 86 is provided with a medially located, horizontal pair of oppositely disposed, flat-sided, mounting ears 88, 89 which if not formed integral are fastened thereto by threaded bolts 87. Each ear is vertically apertured for mounting on the upright rod 42, 43 to which it is secured by the fastening screw 46, 47. Threaded sockets 69 may also be provided in the rear face of the frame for attachment to the vertical standard 60 by the bolts 66. The cutting wires 90 are stretched across the frame 86 in two directions horizontally (usually intersecting at right angles), with the free end of each wire inserted into or thru a bore (FIG. 4) and thence wound around a radially restricted, annular face 91 (FIG. 5) of a doughnut-shaped, flat-ended, tightening button 92 which is secured by a headed screw 94 to the underside or forward moving face of the frame 86. The outer cylindrical portion of each button 92 is formed with an opposing pair of wrench-engageable, flat sides 93 employed for turning the button to make the wire taut.

One form of adjustable cutting head (such as is attached to the standard 60 of FIGURE 1) wherein the spacing between the several parallel cutting wires is variable in a predetermined, unitary pattern is detailed in FIGURES 3–6. The rectangular mounting frame 67 has alternate, threaded attachment sockets 69 and 71, 73 for being removably secured to either the vertically reciprocable rods 42, 43, or to the horizontally movable upright standard 60, as noted. Extending perpendicular back from the outer cross arm 101 toward the inner or bottom cross piece 100 is a mutually parallel pair of channel-forming walls 102, 103 disposed along the inner sides of the respective side arms 104, 105 of the frame. As seen particularly in FIGURE 3, each resulting channel 98, 99 is generally rectangular in section and opens in the forward moving direction of the cutting face of the frame 67, but the two parallel channel housings 102, 103 are staggered fore and aft, relative to the transverse plane of the frame 67 or standard 60 so that a series of mutually parallel, cutting wires 90 suspended thereacross between the two channels 98, 99 will pass thru the block of cheese or other workpiece on a bias.

Longitudinally disposed within each channel is an identical, elongated positioning rod or screw 106, having a distally terminal, smooth stub shaft 108 journalled in the end channel wall 107, 109, and a reduced, anterior end section 110 journalled in a ball bearing mount 112 which is held against the outer face of the cross arm 101 by an apertured retainer cap 114 secured thereto by screws 116. It will be evident that rotation of the positioning rod 106 in either direction does not result in any longitudinal movement thereof when thus mounted by these two, cylindrical bearing sections. Outward from the retainer cap 114, each screw 106 carries a sprocket wheel 118 affixed to the shaft by a threaded nut 120 having locking pins 121 projecting into the hub portion of the sprocket wheel. The two sprocket wheels are connected by an endless chain 122 so that rotation of either of the thus-connected positioning screws 106 results in the other parallel screw 106 being rotated in the same direction a like amount. If desired, a detachable crank handle 123 may also be provided for coupling adjacent the nut 120 to turn the pair of positioning screws 106.

Threadedly mounted on the screw 106 within each channel 98, 99 is an axial series of rectangular attachment posts 124 which are essentially internally threaded nuts, each carrying on its flat, outward projecting, tapped end face, one of the generally annular, wire-tightening buttons 92, held thereagainst by an attachment screw 94 and an intermediate washer 128 (FIG. 4). Each cutting wire 90 stretched across the frame 67 accordingly is (originally) located parallel (to each other) and held taut by one end being thus mounted on one of the nuts 124 in each channel 98, 99. The several nuts or posts 124 cannot turn in the channel because of registration of their opposite sides with the adjacent channel walls, but each is slidable lengthwise along the channel or guideway 98, 99 in response to rotation of the particular segment length of the threaded screw on which the individual nut is mounted. Each positioning screw 106 is formed with a longitudinal or axial series of threaded segment lengths $a, b, c, d, e \ldots$ (FIG. 3 left side) each of different pitch ("number of threads per inch") and diameter in the sequence Table 1

| Pitch | 6⅔ | 8 | 10 | 13 | 20 | 40 |
|---|---|---|---|---|---|---|
| Diameter (inch) | .812 | .749 | .624 | .499 | .436 | .374 |
| Reciprocal of pitch | .150 | .125 | .100 | .077 | .050 | .025 |

It will be observed that the difference between each successive reciprocal is the same (.025) and the result is that—the nuts on a screw being located equidistant to start—rotation of the positioning screw (clockwise or counterclockwise) always moves the nuts together or apart the same amount so as to maintain their separation by a unit amount even tho the length of this unit is increasing or decreasing. The successive diameters are given merely by way of example; likewise the axial length of each threaded segment is a matter of convenience. Any smaller portion of the sequence of pitches can be used. Thus in suspending only three cutting or spacing elements, any three successive pitches could be used for the positioning screws; i.e. 6⅔, 8, 10; or 8, 10, 13; or 10, 13, 20; or 13, 20, 40. Or any successive two, or four, or five pitches can be used. In any case, of course, the pair of positioning screws used would be identical, that is, with the same pitches in the same (end to end) order, the larger pitches at the drive end of the parallel screws or else the smaller pitches at this end, but not the largest pitch at the drive end of one screw and the smallest pitch at the drive end of the other (belt-connected) screw. Also, as mentioned earlier, a single positioning screw can be used alone, with its carried nuts or posts supporting transverse spacing elements which extend on both sides of the guideway.

Figure 7:
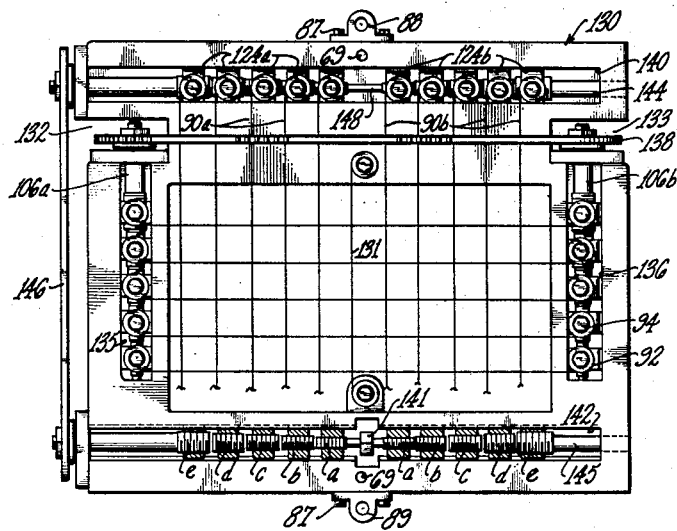
FIGURE 7 is a plan view of another cutting head having two series of parallel cutting wires disposed at right angles to each other, each series having its members adjustably spaced apart by means of the present positioning screws.

Another way of utilizing the successive pitches of Table 1 is an interchangeable head as shown in FIGURE 7. A rectangular frame 130 is provided with detachable mounting ears 88, 89 and threaded sockets 69 for alternate coupling to the horizontal or vertical supports of the cutting and slicing machine 10, as previously detailed. A parallel pair of positioning screws 106a, 106b are rotatably disposed in comparatively short, longitudinal side channels 135, 136 with their outer drive ends located in cut-out portions 132, 133 of the frame, and connected by a sprocket drive chain 138 for unitary movement as in the previous form. Disposed in another, mutually parallel pair of longer, slide channels or guideways 140, 142, located adjacent the other sides or ends of the frame (at right angles to the first pair of channels 135, 136), are "double" positioning screws 144, 145, similarly having their transversely aligned drive ends linked together by a drive belt 146. From a central position 148 along the shaft of each double screw 144, 145 or positioning rod, threaded segments (a, b, c, d, e ...) having the successive pitches listed in Table 1 extend lengthwise in opposite directions. However, for the two halves of the rod (or the two thread sequences) to move its carried nuts 124a and 124b oppositely simultaneously (either apart or together), the threads of the two sequences are respectively right and left hand threads (the shaft 144 being unitary). Thus, when the shaft 144 is rotated in the "Open" or "Separate" direction, the suspension posts or nuts 124b all move to the right (each one sliding further than its centrally adjacent one), and the nuts 124a all slide simultaneously to the left a corresponding amount. When the shaft 144 is counterrotated, both series move centrally toward the position 148, carrying their respective wires 90a and 90b toward a medial, stationary cutting wire 131, while continually maintaining an equal distance or separation between each wire or analogous spacing element. An intermediate nut 141 may be provided on such a shaft 145 for adjustment by a tool such as a wrench, as required. Accordingly it will be seen that by a single pass of the composite spacing or cutting head 130 thru a piece of cheese or the like, it will be fractionated into elongated rods, which by a subsequent cut in the other direction (as by the head 67) are transformed into small cubes or blocks.

Two other constructions for moving the nut-like suspension posts together and apart an equal distance along the guideways of a cutting head or other device by action of the traversing, positioning rod are shown in FIGURES 8 and 9 respectively. In both cases, each rotatable rod 150, 160 is unthreaded and polygonal (e.g. hexagonal) in section, being disposed longitudinally in the slide channel 98a, 98b by a distal bushing collar 152, 153 freely rotatable in the end wall 109a, 109b and with its opposite drive end 151, 161 projecting thru a bearing-raceway-retainer cap 114a, 114b and sprocket wheel 118a, 118b to receive a detachable crank handle 123, as before. The apertured engaging end or hub of the crank handle 123 is internally hexagonal in order to slidingly mount the shaft 150, and an internally hexagonal collar 156 is mounted over the drive end 151 of the positioning rod 150 with the sprocket whel 118a secured to the outer, terminally threaded portion thereof. As before, each pair of parallel rods along opposite sides of the frame 67 are connected for joint rotation by a sprocket drive 122a.

In each case, the series of positioning posts or nuts 124a, 124b are threadedly mounted on individual sleeves 154 or 162 which are internally polygonal to conform to the configuration of the polygonal rod 150 or 160 so as to be slidable therealong but not rotatable about the rod. In other words, the externally threaded sleeves (carrying the nuts) are internally keyed to the positioning rods so as to turn only as the rod is turned; accordingly, rotating the rod turns the keyed sleeve within the outer, threadedly engaged nut so as to slide the latter lengthwise along the channel 98a, 98b.

Two ways are illustrated in which this maintains equal spacing of the members of the series in moving apart and together. In the construction of FIGURE 8, the internally keyed sleeves 154 are externally threaded with right and left hand threads extending medially from the respective ends, and the nuts 124a are correspondingly threaded internally. Only the terminal sleeve 155 is immovable axially along the rod 150 (being fixed to the rotatable bearing collar 152) while the others slide lengthwise along the hexagonal shaft 150. Accordingly, as the terminal sleeve 155 is turned in unison with the rod 150 in a direction to unthread it from the nut 124a mounted thereupon the latter slides axially UP the guideway 98a (as viewed in FIGURE 8). The adjacent sleeve 164 on which the terminal nut is threaded, slides upward the same distance plus simultaneously unscrewing from both its engaged nuts by an amount proportionate to the rotation of the keyed shaft 150; the same thing happens to each consecutive sleeve and nut so that—members of the series being originally spaced equidistant from adjacent members—they move apart and together an equal linear distance and thus preserve their equal spacing.

In the construction of FIGURE 9, the internally keyed sleeves 162 are each axially slidable on the hexagonal rod 160 within the channel 98b, and each is externally threaded from only one end, having its opposite extremity formed with a flanged annulus or abutment head 164 normally disposed against the adjacent nut 124b. Accordingly, as the positioning rod 160 is turned, the terminal nut 224 remains stationary and the terminal sleeve 162a unscrews itself therefrom, with its abutment end 164 sliding the rest of the series UP (as viewed in FIGURE 9) and each successive threaded sleeve and nut similarly and simultaneously unscrewing an equal amount. Counter-rotation of the shaft 160 produces an analogous contraction of the series. At the drive end of the channel 98b, a coiled expansion spring 166 is disposed about the shaft 160 and bears against the adjacent face of the nearest nut 124b, thus ensuring that each abutment flange 164 will be maintained in rotary sliding registration with the face of the adjacent nut.

FIGURES 12–13 show an adjustable pallet 21 composed of generally parallel relatively narrow, vertically disposed slats 23 formed with a transverse series of longitudinally aligned grooves or channels 27 across its top or weight-receiving surface generally perpendicular to the length of the slats. Each slat 23 is transversely apertured adjacent each end to receive a terminally threaded shaft 170, 172 jointly thru the respective ends of the several juxtaposed or laterally separated slats, with an anchoring nut 174 threadedly mounted adjacent each end of the shaft. Each mutually parallel shaft 170, 172 carries an axial series of coiled expansion springs 176 mounted therealong and individually disposed in frictional registration between adjacent slats so as to automatically space them equidistant from adjacent ones as the slats are moved closer together or allowed to separate farther by rotation of the nuts 174. Accordingly, the stationary grooves 27 are spaced to receive the descending cutting wires of a fixed pattern such as carried by the head 48, while the cross channels 178 between or alongside the several parallel slats 23 are adapted to receive a variable spacing pattern such as any of the other cutting heads herein described. It will be apparent that with the appreciable width of the variable channels 178 resulting from use of relatively narrow slats 23, their minute aligning for close insertion of cutting edges is not necessary; and for the same reason, small differences in the tension of successive coils 176 is immaterial.

I claim:
1. A cutting and slicing machine comprising in combination: a pallet formed with transverse channels of variable width and adapted to support a severable workpiece thereacross for fractionation thereof, a spacing head disposed generally parallel to said pallet and having a mutually parallel series of laterally variably separable spacing elements which individually carry a cutting edge, and operative means for effecting relative movement between the pallet and spacing head whereby said cutting edges may be passed thru said workpiece and enter the corresponding channels of the pallet upon fractionating the workpiece supported thereupon.

2. A cutting and slicing machine comprising in combination: a horizontally disposable pallet formed with transverse channels of variable width and adapted to support a severable workpiece thereacross for fractionation thereof, a spacing head having a mutually parallel series of laterally variably separable, spacing elements spaced above and generally parallel to the pallet and having the spacing elements thereof individually provided with a cutting edge in vertical alignment with transverse channels of said pallet, and spring tension means for varying the width of said channels to accommodate varied spacing of the cutting edges.

3. The machine of the preceding claim 1 wherein the spacing head and pallet respectively have a second series of mutually parallel cutting edges and alignable channels disposed perpendicular to said first series.

4. The machine of the preceding claim 3 wherein both series of cutting edges comprise cutting wires.

5. A cutting and slicing machine comprising in combination: a pallet formed with transverse channels of variable width and adapted to support a severable workpiece thereon, reciprocable means for moving successively a pair of generally vertical and horizontal cutting heads relative to a workpiece on the pallet for fractionating the same, and respective generally vertically and horizontally disposed cutting heads operable by said reciprocable means, at least one of which heads includes walls defining an elongated guideway having rotational bearing mounts located adjacent each end thereof, an elongated rod disposed longitudinally along said guideway and rotatably held in said bearing mounts, a series of spacing posts mounted along said rod and individually slidable along said guideway axially to said rod, and axially slidable operative means disposed in functional contact with both said rod and each of said posts for respectively separating and moving together along said guideway while simultaneously maintaining their equal distance from adjacent members, posts of said series in response to rotation of said rod in one direction or the other.

6. The combination comprising a cutting head having a mutually parallel series of laterally variably separable, elongated cutting elements, and a pallet comprising a plurality of generally parallel, lateraly separated, elongated slats, individually transversely apertured adjacent each end thereof, a parallel pair of transverse shafts disposed thru the respective apertures of the opposite ends of said slats, individual coil springs carried on each shaft between and in registration with adjacent slats whereby the several slats are automatically disposed equidistant from adjacent slats along each shaft, and anchoring means associated with said shafts and adapted for adjustably locating the several slats closer together and further apart therealong, said slats also having their weight-receiving surfaces jointly transversely grooved approximately perpendicular to their length so as to form a grid in association with the channels formed between their laterally separated sides.

7. In combination with a cutting and slicing machine of the character described having a cutting head carrying variably spaced cutting elements and a pallet vertically movable relative to one another for fractionating a workpiece disposed on said pallet, the improvement wherein said pallet comprises a plurality of generally parallel, laterally separated, elongated slats, self-aligning means for disposing said slats spaced apart equidistant, and other means for selectively locating said slats closer together and further apart so as to receive the cutting elements of the head therebetween.

8. The machine of the preceding claim 1 wherein said spacing elements comprise internally threaded posts, laterally spaced apart along a rotatable positioning rod upon which they are loosely and non rotatably mounted and which rod carries a series of sleeves disposed axially slidable therealong and rotatable only in unison therewith, individual sleeves having one end in abutment with one of said posts and its other end threadedly received within an adjacent post, whereby rotation of said rod causes the several posts to move toward and away from each other equidistant along the rod.

References Cited in the file of this patent
UNITED STATES PATENTS

| | | |
|---|---|---|
| 653,991 | Ferry | July 17, 1900 |
| 660,939 | Webb | Oct. 30, 1900 |
| 872,422 | Hodell | Dec. 3, 1907 |
| 884,845 | Nicklin et al. | Apr. 14, 1908 |
| 935,425 | Stewart | Sept. 28, 1909 |
| 2,098,816 | Walma | Nov. 9, 1937 |
| 2,692,430 | Draft et al. | Oct. 26, 1954 |

UNITED STATES PATENT OFFICE
CERTIFICATE OF CORRECTION

Patent No. 3,142,905                                    August 4, 1964

Ray H. Strasbaugh

It is hereby certified that error appears in the above numbered patent requiring correction and that the said Letters Patent should read as corrected below.

In the heading to the printed specification, lines 3 and 4, for "Ray H. Strasbaugh, 10990 S. Santa Fe Ave., Downey, Calif." read -- Ray H. Strasbaugh, Downey, Calif. (10990 S. Santa Fe Ave., Lynwood, Calif.). --.

Signed and sealed this 22nd day of December 1964.

(SEAL)
Attest:

ERNEST W. SWIDER
Attesting Officer

EDWARD J. BRENNER
Commissioner of Patents